(12) United States Patent
Aota et al.

(10) Patent No.: US 8,598,763 B2
(45) Date of Patent: Dec. 3, 2013

(54) FIELD ELEMENT

(75) Inventors: Keiji Aota, Shiga (JP); Yoshihito Sanga, Shiga (JP); Akio Yamagiwa, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 63 days.

(21) Appl. No.: 12/991,351

(22) PCT Filed: Apr. 22, 2009

(86) PCT No.: PCT/JP2009/057994
§ 371 (c)(1),
(2), (4) Date: Nov. 5, 2010

(87) PCT Pub. No.: WO2009/136545
PCT Pub. Date: Nov. 12, 2009

(65) Prior Publication Data
US 2011/0062815 A1    Mar. 17, 2011

(30) Foreign Application Priority Data
May 8, 2008   (JP) .................................. 2008-122256

(51) Int. Cl.
*H02K 1/24* (2006.01)
*H02K 1/27* (2006.01)

(52) U.S. Cl.
USPC ............ 310/156.57; 310/156.53; 310/156.56; 310/216.092

(58) Field of Classification Search
USPC ...................... 310/156.53–156.57, 216.092
See application file for complete search history.

(56) References Cited

U.S. PATENT DOCUMENTS

| | | | | |
|---|---|---|---|---|
| 5,861,693 A * | 1/1999 | Takahashi | ...................... | 310/113 |
| 6,049,153 A * | 4/2000 | Nishiyama et al. | .... | 310/216.009 |
| 6,087,751 A | 7/2000 | Sakai | | |
| 6,147,428 A * | 11/2000 | Takezawa et al. | ........ | 310/156.57 |
| 6,798,104 B2 * | 9/2004 | Kajiura et al. | .................. | 310/162 |
| 7,151,335 B2 * | 12/2006 | Tajima et al. | ............ | 310/156.48 |
| 7,808,143 B2 * | 10/2010 | Lee et al. | .................. | 310/156.53 |
| 2006/0145556 A1 * | 7/2006 | Aota et al. | ............... | 310/156.53 |
| 2008/0007131 A1 * | 1/2008 | Cai et al. | ................... | 310/156.38 |
| 2009/0026865 A1 | 1/2009 | Aota et al. | | |

FOREIGN PATENT DOCUMENTS

| | | | |
|---|---|---|---|
| EP | 2012410 A1 | 1/2009 | |
| JP | 8-340651 A | 12/1996 | |
| JP | 11-136912 A | 5/1999 | |
| JP | 2000-50546 A | 2/2000 | |
| JP | 2000217287 A * | 8/2000 | ............... H02K 1/27 |
| JP | 2003-88015 A | 3/2003 | |
| JP | 2003-143816 A | 5/2003 | |
| JP | 2004-104962 A | 4/2004 | |
| JP | 2007-174738 A | 7/2007 | |
| JP | 2007-295676 A | 11/2007 | |
| JP | 2007-300796 A | 11/2007 | |

* cited by examiner

*Primary Examiner* — Tran Nguyen
(74) *Attorney, Agent, or Firm* — Birch, Stewart, Kolasch & Birch, LLP

(57) ABSTRACT

A field element core has a perimeter exposed around a rotation axis and a plurality of field magnet insertion holes circularly disposed around the rotation axis P. A radius between the perimeter and the rotation axis P decreases in a monotonically non-increasing manner from a pole center toward an interpole and then increases in a monotonically non-decreasing manner in a region between the pole center and the interpole in a circumferential direction.

20 Claims, 3 Drawing Sheets

FIELD ELEMENT

FIELD ELEMENT

1. Technical Field

The present invention relates to a field element, and more particularly, to an embedded type field element.

2. Background Art

Japanese Patent Application Laid-Open No. 2003-88015 describes an interior permanent magnet rotor capable of reducing cogging torque. The rotor includes a rotor core and four permanent magnets that are built and disposed in the rotor core. These permanent magnets are circularly disposed with a rotation axis being the center. An outer contour of the rotor core has a so-called petal shape in which the radius on both end sides of the permanent magnets is smaller than the radius on the center side of the permanent magnets in a circumferential direction with the rotation axis being the center.

Accordingly, a magnetic field distribution of a magnetic flux density distribution is improved, so that the magnetic flux density distribution is made close to a sinusoidal distribution.

Note that the technologies related to the present application are disclosed in Japanese Patent Application Laid-Open No. 2007-300796, Japanese Patent Application Laid-Open No. 2004-104962 and Japanese Patent Application Laid-Open No. 2003-143816.

DISCLOSURE OF INVENTION

Problem to be Solved by the Invention

However, in the technology described in Japanese Patent Application Laid-Open No. 2003-88015, a gap (air gap) between the rotor and a stator facing the rotor in a direction perpendicular to the rotation axis is large on the both end sides of the permanent magnets. Therefore, in some cases, an air gap is measured only on the center side of the permanent magnets, and the rotor and the stator are fixed.

An object of the present invention is therefore to provide a field element capable of easily measuring an air gap at both ends of the permanent magnets while reducing cogging torque.

Means to Solve the Problem

According to a first aspect of the present invention, a field element includes: a plurality of field magnets (20, 21, 22); and a field element core (1) having a perimeter (10) exposed around a predetermined axis (P), and a plurality of field magnet insertion holes (30, 31, 33) disposed circularly around the axis, at least one of the plurality of field magnets is inserted into each of said at least one of said plurality of field magnets, wherein: the at least one of the plurality of field magnets inserted into each of the plurality of field magnet insertion holes is disposed with magnetic pole surfaces of a single polarity facing the perimeter; one of the plurality of field magnet insertion holes and another of the plurality of field magnet insertion holes are adjacent to each other in a circumferential direction (D) with the axis being a center, where the magnetic pole surface of the at least one of the plurality of field magnets inserted into the one of the plurality of field magnet insertion holes and the magnetic pole surface of the at least one of the plurality of field magnets inserted into the another of the plurality of the field magnet insertion holes are different from each other in polarity; and between a first position (101) in the circumferential direction at which a center of the one of the plurality of field magnet insertion holes in the circumferential direction is positioned and a second position (102) in the circumferential direction at which a center between the one of the plurality of field magnet insertion holes and the another of the plurality of field magnet insertion holes in the circumferential direction is positioned, a distance (R) between the axis and the perimeter decreases in a monotonically non-increasing manner from the first position toward the second position along the circumferential direction and then increases in a monotonically non-decreasing manner.

According to a second aspect of the field element of the present invention, in the field element according to the first aspect, each of the plurality of field magnet insertion holes has, at both ends in the circumferential direction (D), first cavity portions (31) on a side closer to the perimeter (10) than the at least one of the plurality of field magnets (21, 22) inserted thereinto; the field element core (1) further has second cavity portions (32) each disposed along the perimeter on the first position (101) side with respect to the first cavity portion, apart from the first cavity portion in the circumferential direction (D); and a point (11) on the perimeter at which the distance (R) turns from decreasing to increasing between the first position and the second position is positioned on a side closer to the second position in the circumferential direction than an end (321) on the first position side of the second cavity portion in the circumferential direction.

According to a third aspect of the field element of the present invention, in the field element according to the first aspect, each of the plurality of field magnet insertion holes (30) has, at both ends in the circumferential direction (D), cavity portions (33) on a side closer to the perimeter (10) than the at least one of the plurality of field magnets (21, 22) inserted thereinto, the cavity portions (33) extending in a direction toward the perimeter (10) and a direction toward the first position (101) along the perimeter; and a point (11) on the perimeter (10) at which the distance (R) turns from decreasing to increasing between the first position (101) and the second position (102) is positioned on a side closer to the second position in the circumferential direction than an end (321) on the first position side of the cavity portion in the circumferential direction.

According to a fourth aspect of the field element of the present invention, in the field element according to any one of the first to third aspects, the center of the one of the plurality of field magnet insertion holes in the circumferential direction (D) is positioned on the axis (P) side with respect to a straight line connecting both ends in the circumferential direction of the at least one of the plurality of field magnets inserted into the one of the plurality of field magnet insertion holes (30).

According to a fifth aspect of the field element of the present invention, in the field element according to any one of the first to fourth aspects, a coercive force of the at least one of the plurality of field magnets (20) is larger on an end portion side of one of the plurality of field magnet insertion holes in the circumferential direction than on the center side of the one of the plurality of field magnet insertion holes (30) into which itself is inserted.

According to a sixth aspect of the field element of the present invention, in the field element according to any one of the first to fifth aspects, an energy product of the at least one of the plurality of field magnets (20) is larger on an end portion side of one of the plurality of field magnet insertion holes in the circumferential direction than on the center side of the one of the plurality of field magnet insertion holes (30) into which itself is inserted.

According to a seventh aspect of the field element of the present invention, in the field element according to any of the first to sixth aspects, the at least one of the plurality of field magnets includes a plurality of field magnets, the plurality of field magnets inserted into the one of the plurality of field magnet insertion holes (30) being adjacent to each other in the circumferential direction (D) or in a direction parallel to the axis (P).

Effects of the Invention

According to the first aspect of the field element of the present invention, at least one of field magnets inserted into one field element insertion hole causes a field element core on a perimeter side of the field element insertion hole to function as one magnetic pole of the field element. Magnetic poles that the field magnet insertion holes adjacent to each other in the circumferential direction cause the field element cores on the perimeter side thereof have polarities different from each other. The first position is the center of the magnetic poles (magnetic pole center) and the second position is between the magnetic poles (between magnetic poles). The distance between the axis and the perimeter decreases from the first position toward the second position. A magnetoresistance increases due to a decrease in the distance, with the result that the waveform of the magnetic flux density generated on the surface of the perimeter by the field magnet can be made close to a sinusoidal wave that is minimized between magnetic poles and maximized at the magnetic pole center.

Further, the distance increases again between the magnetic poles. However, the magnetic flux density is small between the magnetic poles, and thus the waveform of the magnetic flux density is only slightly affected even when the magnetoresistance is reduced. Therefore, in a case where an armature opposed to the field element is provided in the direction parallel to the rotation axis, it is possible to reduce a gap (air gap) between the field element and the armature between the magnetic poles while making the waveform of the magnetic flux density close to a sinusoidal wave. As a result, the distance between the field element and the armature between the magnetic poles can be measured with ease. Accordingly, it is possible to increase the positions at which the distance between the field element and the armature is measured, and a relative position between the field element and the armature can be fixed with accuracy.

According to the second aspect of the field element of the present invention, the magnetoresistance increases due to a decrease of the distance in the region in which the distance decreases from the first position toward the second position, and then the magnetoresistance can be increased due to the second cavity portion in the region in which the distance increases toward the second position. Normally, in order to make the waveform of the magnetic flux density generated in the perimeter close to a sinusoidal wave, an increase in magnetoresistance is decreased as closer to the first position. According to the field element of the second aspect, the magnetoresistance can be adjusted base on a decrease in distance at the position close to the first position, whereby it is possible to finely adjust the magnetoresistance. Further, the first cavity portion and the second cavity portion are apart from each other, and thus the strength of the field element core can be enhanced.

According to the third aspect of the field element of the present invention, the magnetoresistance increases due to a decrease of the distance in the region in which the distance decreases from the first position toward the second position, and then the magnetoresistance can be increased due to the cavity portion in the region in which the distance increases toward the second position. Normally, in order to make the magnetic flux density generated on the perimeter close to a sinusoidal wave, an increase in magnetoresistance is reduced as closer to the first position. According to the field element of the third aspect, the magnetoresistance can be adjusted based on a decrease of the distance at the position close to the first position, whereby it is possible to finely adjust the magnetoresistance.

According to the fourth aspect of the field element of the present invention, the field magnets are tilted, toward the perimeter side, from the magnetic pole center to between the magnetic poles in one magnetic pole, and thus the magnetic flux density on the first position side can be enhanced. Accordingly, the magnetic flux density can be made closer to a sinusoidal wave.

According to the fifth aspect of the field element of the present invention, the demagnetization resistance can be enhanced.

According to the sixth aspect of the field element of the present invention, a high magnetic flux density can be generated at the center of the perimeter in the circumferential direction.

According to the seventh aspect of the field element of the present invention, an eddy current flowing through the surface of the field magnet can be reduced. Normally, demagnetization is more likely to occur along with a temperature rise of the field magnet. Therefore, the Joule heat can be reduced by reducing the eddy current, and accordingly the demagnetization resistance can be enhanced.

The object, features, aspects, and advantages of the present invention will be more apparent from the following detailed description in conjunction with the attached drawings.

BEST MODE FOR CARRYING OUT THE INVENTION

Figure 1:
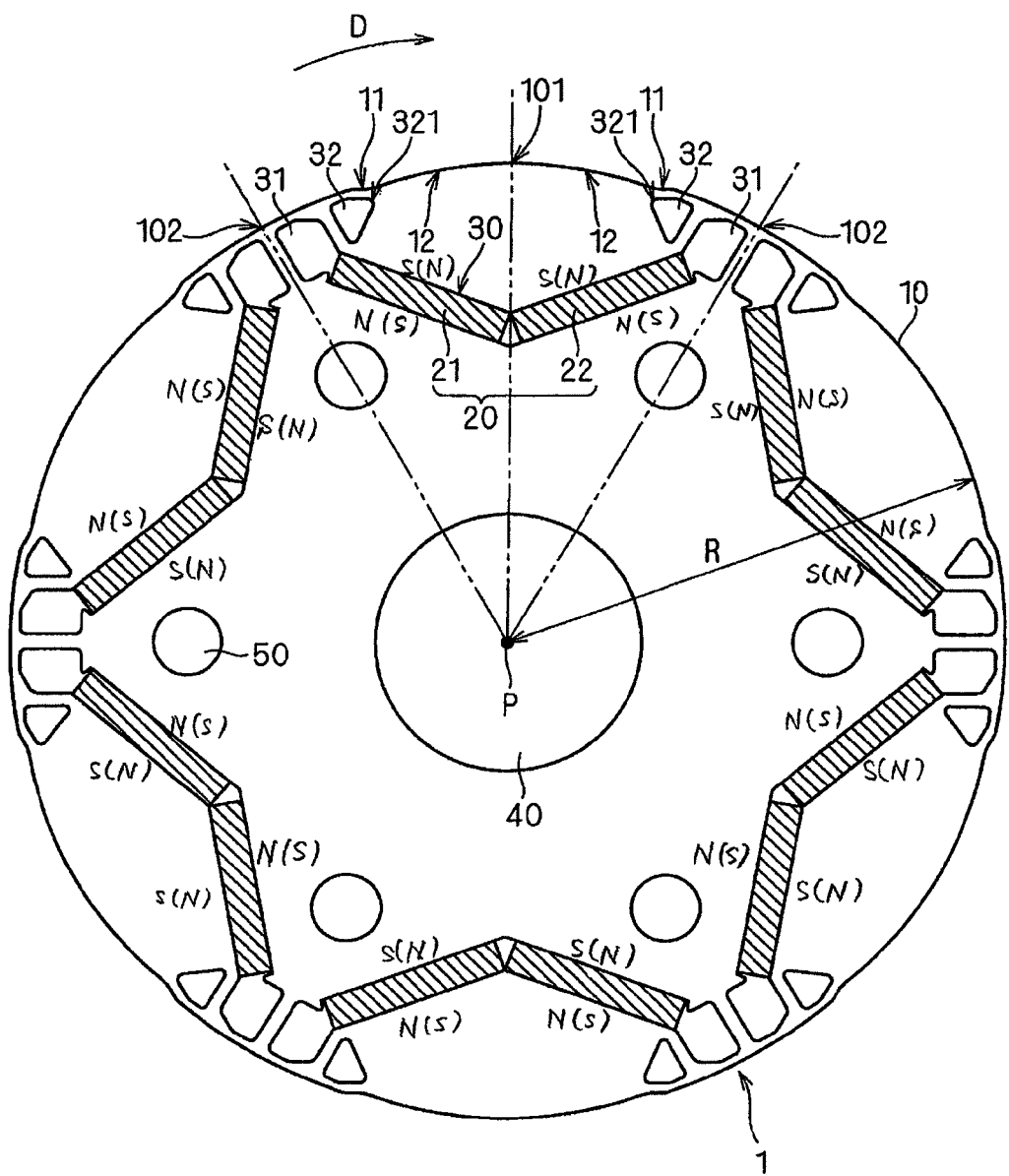
FIG. 1 is a schematic cross-sectional view of a field element according to an embodiment.

FIG. 1 is a schematic cross-sectional view of a field element according to an embodiment of the present invention. FIG. 1 shows the schematic structure of the field element in cross section perpendicular to a rotation axis P. The field element includes a field element core 1 and a plurality of field magnets 20.

The field element core 1 has a perimeter 10 exposed around the rotation axis P, a plurality of field magnet insertion holes 30 circularly disposed around the rotation axis P, cavity portions 32, a shaft hole 40, and holes 50 for bolts or pins.

The shaft hole 40 is provided in a region including the rotation axis P while penetrating through the field element core 1 in a direction parallel to the rotation axis P. Note that the shaft hole 40 is not necessarily required. For example, the shaft hole 40 is not required in a mode in which end plates are provided to both ends of the field element core 1 in the direction parallel to the rotation axis P and a shaft is mounted to the end plates.

The holes 50 are disposed, for example, circularly around the rotation axis P and penetrate through the field element core 1 in the direction parallel to the rotation axis P. A pin or bolt is inserted into the hole 50. For example, the field element core 1 is sandwiched between the end plates from both sides, and the entirety is fixed with pins or bolts through the holes 50. Note that the holes 50 are not necessarily required as long as there is provided a mode in which, for example, the field element core 1 and the end plates are fixed by welding.

The plurality of field magnet insertion holes 30 are circularly disposed around the rotation axis P. At least one field magnet is inserted into each of the field magnet insertion holes 30. FIG. 1 illustrates a mode in which two field magnets 21 and 22 are inserted into each of the field magnet insertion holes 30. The field magnets 21 and 22 cause the field element core 1 on the perimeter 10 side to function as magnetic poles. Note that in the description below, a pair of field magnets 21 and 22 inserted into one field magnet insertion hole 30 is referred to as the field magnet 20.

Magnetic pole surfaces of the field magnet 20 are disposed such that single magnetic pole faces the perimeter side. Herein, the field magnets 21 and 22 respectively inserted into each of the field magnet insertion holes 30 are disposed with the magnetic pole surfaces of the same polarity facing the perimeter 10. Polarities are different from each other between the magnetic pole surfaces on which the field magnets 21 and 22 that are inserted into one of a pair of adjacent field magnet insertion holes 30 in a circumferential direction D face the perimeter 10 and the magnetic pole surfaces on which the field magnets 21 and 22 that are inserted into the other thereof face the perimeter 10. Therefore, polarities are different from each other between the magnetic poles that the field magnet insertion holes 30 adjacent to each other in the circumferential direction D cause the field element core 1 on the perimeter 10 side thereof to function.

Further, the field magnet insertion holes 30 may have cavity portions 31 at end portions in the circumferential direction thereof. The cavity portions 31 are disposed on the side closer to the perimeter side than both ends of the field magnets 20. Although the cavity portion 31 is not necessarily required, it is possible to reduce the leakage flux of the field magnet 20 by this.

The cavity portions 32 are disposed along the perimeter 10 on the center side (pole center 101 side described below) of the field magnet insertion hole 30 in the circumferential direction D with respect to the cavity portion 31 while being apart from the cavity portions 31 in the circumferential direction. Note that the cavity portion 32 is also necessarily required. The function of the cavity portion 32 is described below.

A radius R between the rotation axis P and the perimeter 10 is not uniform in accordance with the circumferential direction D. Herein, the center of the field magnet insertion hole 30 in the circumferential direction D is referred to as a pole center 101. The center of the field magnet insertion holes 30 adjacent to each other in the circumferential direction D is referred to as an interpole 102. In a region between the pole center 101 and the interpole 102 in the circumferential direction D, the radius R decreases from the pole center 101 toward the interpole 102 along the circumferential direction D in a monotonically non-increasing manner and then increases in a monotonically non-decreasing manner.

A rotating electric machine can be configured by disposing an armature so as to radially face the field element with the rotation axis P being the center. In the field element, the radius R decreases in a monotonically non-increasing manner from the pole center 101 toward the interpole 102. Therefore, a distance (air gap) between the field element and the armature increases from the pole center 101 toward the interpole 102. Accordingly, a magnetoresistance increases from the pole center 101 toward the interpole 102, and thus it is possible to make a waveform of the magnetic flux density generated by the field magnet 20 close to a sinusoidal wave.

On the other hand, the radius R increases again on the interpole 102 side. However, the magnetic flux density generated by the field magnet 20 is small on the interpole 102 side, whereby the magnetoresistance only slightly affects the waveform of the magnetic flux density even when an air gap is reduced on the interpole 102 side and the magnetoresistance is reduced. Accordingly, the distance between the field element and the armature can be easily measured on the interpole 102 side even while making the waveform of the magnetic flux density close to a sinusoidal wave. As a result, it is possible to extend the region at which the distance between the field element and the armature is measured, with the result that a relative position between the field element and the armature can be fixed with accuracy.

Next, the cavity portion 32 is described in detail. The cavity portion 32 has a shape in which a width in a radial direction with the rotation axis P being the center becomes narrower toward the pole center 101. A point 11 on the perimeter 10 at which the radius R turns from decreasing to increasing in the circumferential direction D is positioned on the side closer to the interpole 102 than one end 321 of the cavity portion 32 on the pole center 101 in the circumferential direction D. Assuming that an angle with the rotation axis P being the center is θ, a rate of increase $dR/d\theta$ of the radius R in the circumferential direction D is smaller than a rate of increase $dH/d\theta$ of a width H of the cavity portion 32 in the radial direction at the same positions in the circumferential direction D.

A magnetoresistance is increased from the pole center 101 toward the interpole 102 by decreasing the radius R from the pole center 101 toward the interpole 102 in a monotonically non-increasing manner. Then, the magnetoresistance can be increased by the cavity portion 32 in the region in which the radius R increases. Accordingly, the magnetoresistance can be increased even in the region in which the radius R increases, and hence the magnetic flux density can be made close to a sinusoidal wave.

Furthermore, the magnetoresistance can be increased without reducing the radius R by the cavity portion 32, and thus the distance between the field element and the armature is not increased. Therefore, the distance can be measured easily even at a position at which the cavity portion 32 is positioned.

Note that in terms of fine adjustment of the magnetoresistance from the pole center 101 toward the interpole 102, decreasing the radius R depending on the circumferential direction is preferable to providing the cavity portion 32. This is because the shape of the cavity portion 32 on the one end 321 side is rounded in actuality, and thus fine adjustment of the width is limited in a region in which the width of the cavity portion 32 in the radial direction is small. Further, in a case where, for example, the cavity portion 32 is formed by punching, durability of a punching member becomes more problematic as the shape on the one end 321 side becomes sharper.

On the other hand, fine adjustment of the radius R in a continuous manner from the pole center 101 in accordance with the circumferential direction D is achieved more easily compared with the adjustment of the width of the cavity portion 32. This is because it suffices that, for example, the perimeter 10 is cut. Even in a case where it is formed by, for example, punching, the perimeter 10 is continuous with an obtuse angle, and accordingly a problem is unlikely to occur in the durability of the punching member.

In the present embodiment, the radius R is reduced once from the pole center 101 side toward the interpole 102 to increase a magnetoresistance, and the magnetoresistance is increased by the cavity portion 32. Therefore, it is possible to prevent a reduction of the radius R on the interpole 102 side while finely adjusting the magnetoresistance on the pole center 101 side. In addition, an angle of a tip shape of the cavity portion 32 on the one end side 321 is not required to be reduced, and thus the cavity portion 32 can be formed with ease. In a case where the cavity portion 32 is formed by punching, it is possible to improve the durability of the punching member.

Further, in the present embodiment, the center of the field magnet insertion hole 30 in the circumferential direction D is positioned on the rotation axis P side with respect to a straight line connecting both ends of the field magnet 20 in the circumferential direction D. That is, the field magnets 21 and 22 are disposed in a V-shape. As a result, the magnetic flux density generated by the field magnets 21 and 22 can be concentrated on the pole center 101 side. Therefore, a waveform of the magnetic flux density can be made closer to a sinusoidal wave. Further, in this case, it is not required to reduce the magnetic flux density generated by the field magnet 20 by a magnetoresistance to be made close to a sinusoidal wave on the pole center 101 side. Accordingly, the radius R can be made uniform from the pole center 101 to a predetermined region in the circumferential direction (region from the pole center 101 to a point 12 in FIG. 1; however, the point 12 is positioned on the pole center 101 side with respect to the point 11), and hence it is possible to effectively use the magnetic flux density generated by the field magnet 20.

Figure 2:
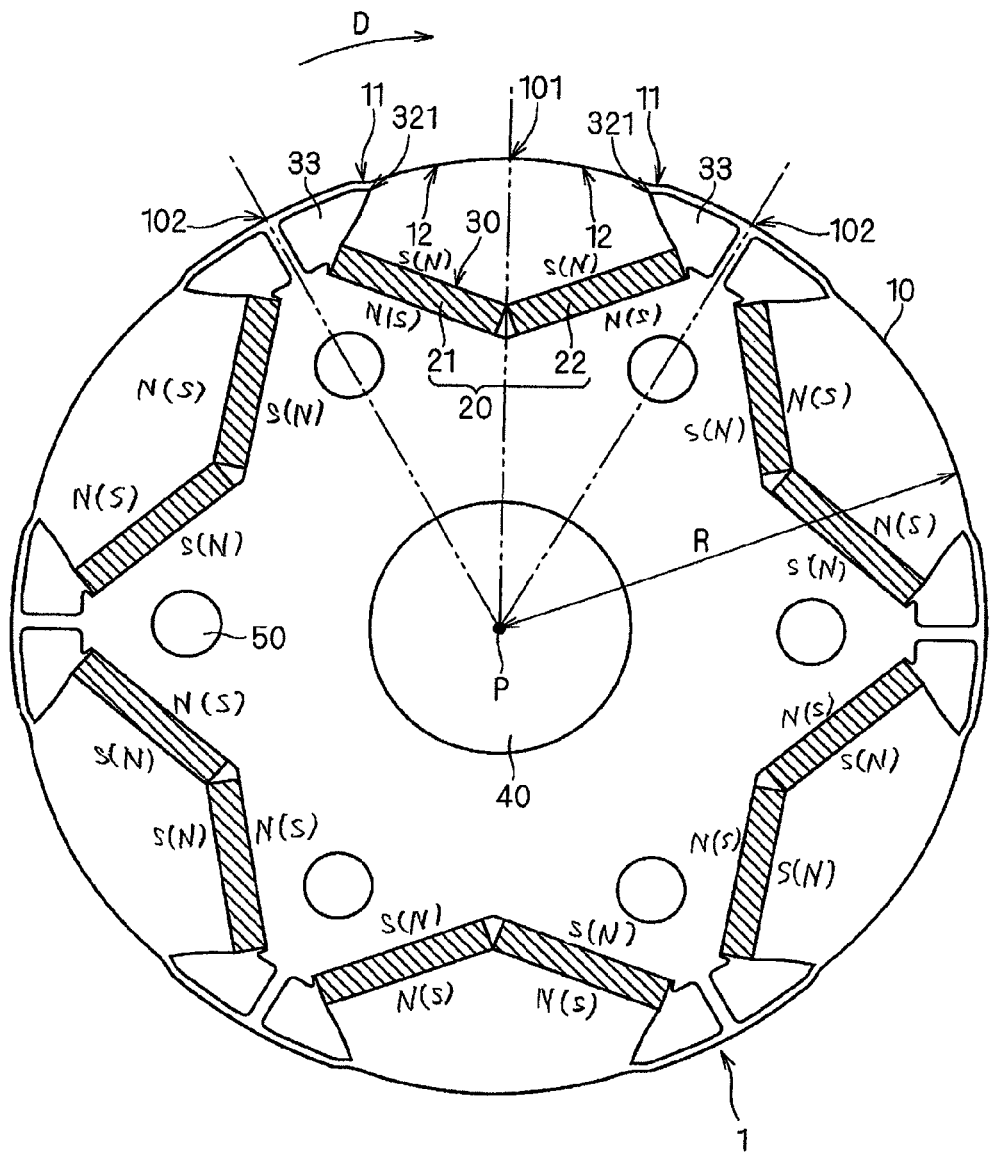
FIG. 2 is a schematic cross-sectional view of another example of the field element according to the embodiment.

Note that while a mode in which the cavity portions 31 and 32 are apart from each other is shown in the field element shown in FIG. 1, it is not necessarily limited thereto. FIG. 2 is a conceptual cross-sectional view showing another example of the field element according to the embodiment. FIG. 2 shows a schematic structure of the field element in cross section perpendicular to the rotation axis P.

Compared with the field element shown in FIG. 1, the field element core 1 has cavity portions 33 in place of the cavity portions 31 and 32. The cavity portions 33 extend, from both ends of the field magnet 20 in the circumferential direction D, in a direction toward the perimeter 10 and in a direction toward the pole center 101 along the perimeter 10. The cavity portion 33 has a shape in which a width thereof in the radial direction becomes narrower toward the pole center 101.

The point 11 at which the radius R turns from decreasing to increasing is positioned on the side closer to the interpole 102 than one end 331 of the cavity portion 33 in the circumferential direction D on the pole center 101 side. Further, a rate of increase of the radius R in the circumferential direction D is smaller than a rate of increase of the width of the cavity portion 33 in the radial direction at the same positions in the circumferential direction D.

It is possible to achieve similar effects to those of the field element shown in FIG. 1 also by the field element with the above-mentioned structure.

Note that the strength of the field element core 1 can be improved by providing the field element core 1 between the cavity portions 31 and 32 as shown in FIG. 1. The field element core 1 between the cavity portions 31 and 32 can be considered as a bridge.

Figure 3:
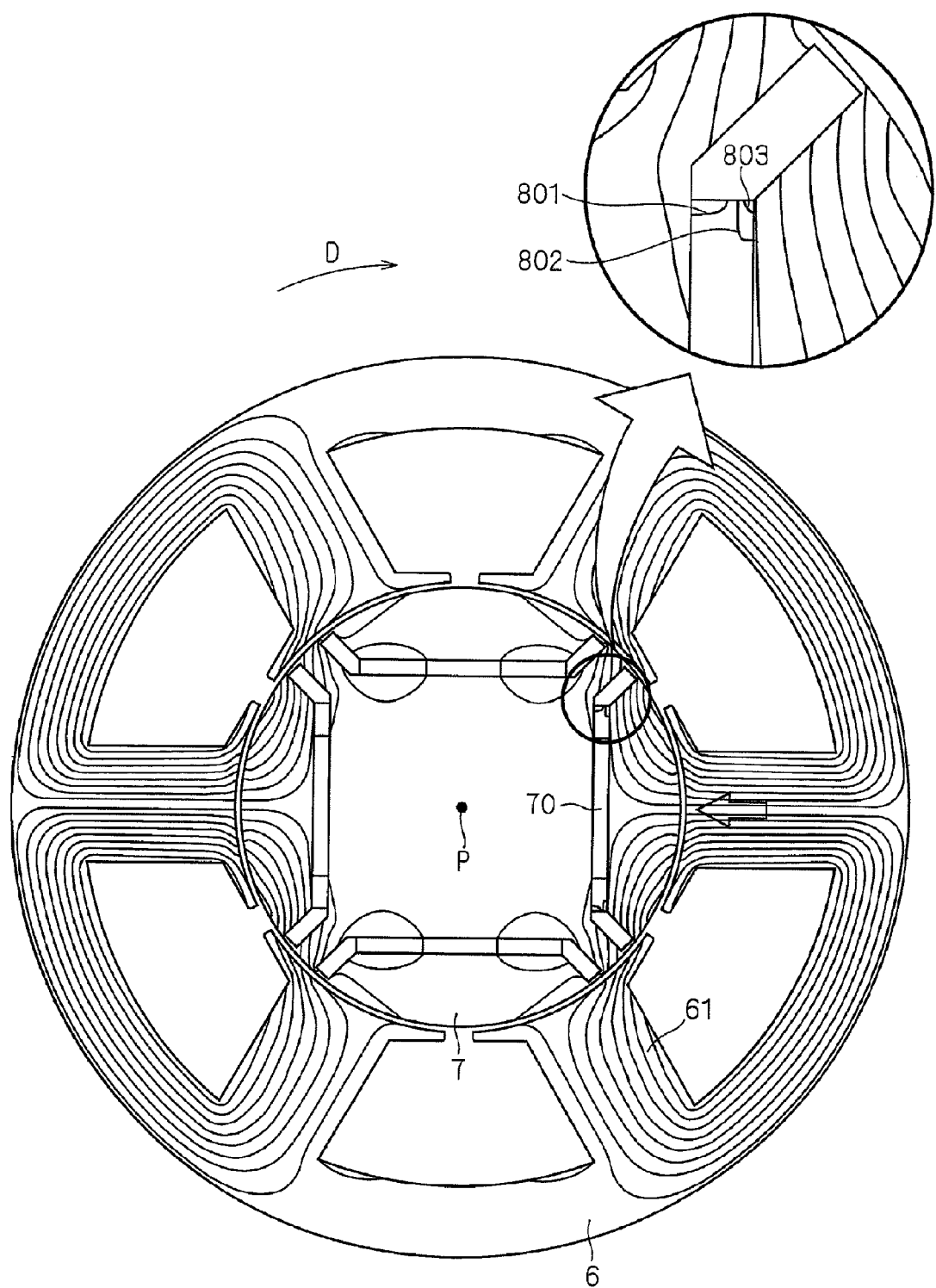
FIG. 3 is a schematic cross-sectional view of the field element according to the embodiment.

FIG. 3 shows, in a motor including a conventional field element and an armature, magnetic flux lines and the magnetic flux density inside the field magnet when an opposing magnetic field is generated in the field magnet. Note that among field magnets 70 described below, the magnetic flux density inside thereof is shown as to the only field magnet 70 positioned on the right side in FIG. 1, whereas magnetic flux lines are shown as to the other field magnets 70. The conventional field element includes, for example, a field element core 7 and field magnets 70. The field magnets 70 have a flat shape and are circularly disposed around the rotation axis P. The armature is disposed so as to face the field element from the opposite side to the rotation axis P. The armature includes an armature core 6 that includes teeth 61 protruding toward the rotation axis P side. Note that an armature winding wound around the teeth 61 is not shown.

FIG. 3 shows the magnetic flux lines and the magnetic flux density inside the field magnet 70 when one field magnet 70 faces one tooth 61. Further, the direction of the magnetic flux is indicated by a block arrow. The opposite magnetic field is applied to this one field magnet 70. The magnetic flux density on one end side of this one field magnet 70 in the circumferential direction D is shown under magnification. The magnitude of the magnetic flux density is indicated by contour lines 801 to 803. The contour lines 801 to 803 indicate that the magnetic flux density becomes smaller in this order.

It is found that the magnetic flux density is reduced in the region indicated by the contour line 803. That is, the field magnet 70 tends to be subjected to demagnetization at this one end. Note that the same holds true for the other end of the field magnet 70.

Therefore, it is desirable that in the field element according to the present embodiment, a coercive force of the field magnet 20 be larger on the end portion side of the field magnet insertion hole 30 than at the center of the field magnet insertion hole 30 in the circumferential direction D. As a result, the demagnetization resistance can be enhanced on the end portion side of the field magnet 20.

Further, it is desirable that an energy product of the field magnet 20 be larger on the end portion side of the field magnet insertion hole 30 than on the center side of the field magnet insertion hole 30. Accordingly, it is possible to generate a high magnetic flux density at the center of each of magnetic pole surfaces on the perimeter 10 in the circumferential direction D.

Note that in FIGS. 1 and 2, two field magnets 21 and 22 are inserted into one field magnet insertion hole 30, and the field magnets 21 and 22 are adjacent to each other in the direction parallel to the circumferential direction D. An insulator (air) exists between the field magnets 21 and 22, with the result that an eddy current flowing through the field magnet 20 can be reduced. Normally, the field magnet tends to be subjected to demagnetization along with a temperature rise thereof. Therefore, the Joule heat can be reduced by reducing an eddy current, and thus the demagnetization resistance can be enhanced. Note that the field magnets 21 and 22 may be adjacent to each other in the direction parallel to the rotation axis P. Alternatively, three or more field magnets may be inserted into one field magnet through hole 30.

While the invention has been shown and described in detail, the foregoing description is in all aspects illustrative and not restrictive. It is therefore understood that numerous modifications and variations can be devised without departing from the scope of the invention.

The invention claimed is:

1. A field element, comprising:
   a plurality of field magnets; and
   a field element core having:
   a perimeter exposed around a predetermined axis; and
   a plurality of field magnet insertion holes disposed circularly around said predetermined axis, at least one of said plurality of field magnets being inserted into each of said at least one of said plurality of field magnet insertion holes, wherein:

said at least one of said plurality of field magnets inserted into each of said plurality of field magnet insertion holes is disposed with a magnetic pole surface of a single polarity facing said perimeter;

one of said plurality of field magnet insertion holes and another of said plurality of field magnet insertion holes are adjacent to each other in a circumferential direction with said predetermined axis being a center, said magnetic pole surface of said single polarity of said at least one of said plurality of field magnets inserted into said one of said plurality of field magnet insertion holes and said magnetic pole surface of said at least one of said plurality of field magnets inserted into said another of said plurality of said field magnet insertion holes being different from each other in polarity;

between a first position positioned in said circumferential direction at a center of said one of said plurality of field magnet insertion holes in said circumferential direction and a second position positioned in said circumferential direction at which a center between said one of said plurality of field magnet insertion holes and said another of said plurality of field magnet insertion holes in said circumferential direction, a distance between said predetermined axis and said perimeter decreases in a monotonically non-increasing manner from said first position toward said second position along said circumferential direction and then increases in a monotonically non-decreasing manner;

each of said plurality of field magnet insertion holes has, at both ends in said circumferential direction, first cavity portions on a side closer to said perimeter than said at least one of said plurality of field magnets inserted thereinto;

said field element core further has second cavity portions each disposed along said perimeter on said first position side with respect to said first cavity portions, apart from said first cavity portions in said circumferential direction;

at a point on said perimeter, said distance turns from decreasing to increasing between said first position and said second position is positioned on a side closer to said second position in said circumferential direction than an end of said second cavity portion on said first position side in said circumferential direction; and said first cavity portion and said second cavity portion are substantially positioned between said point and said second position in said circumferential direction.

2. A field element, comprising:
a plurality of field magnets; and
a field element core having:
 a perimeter exposed around a predetermined axis; and
 a plurality of field magnet insertion holes disposed circularly around said predetermined axis at least one of said plurality of field magnets being inserted into each of said at least one of said plurality of field magnet insertion holes, wherein:

said at least one of said plurality of field magnets inserted into each of said plurality of field magnet insertion holes is disposed with a magnetic pole surface of a single polarity facing said perimeter;

one of said plurality of field magnet insertion holes and another of said plurality of field magnet insertion holes are adjacent to each other in a circumferential direction with said predetermined axis being a center, said magnetic pole surface of said single polarity of said at least one of said plurality of field magnets inserted into said one of said plurality of field magnet insertion holes and said magnetic pole surface of said at least one of said plurality of field magnets inserted into said another of said plurality of said field magnet insertion holes being different from each other in polarity;

between a first position positioned in said circumferential direction at a center of said one of said plurality of field magnet insertion holes in said circumferential direction and a second position positioned in said circumferential direction at which a center between said one of said plurality of field magnet insertion holes and said another of said plurality of field magnet insertion holes in said circumferential direction, a distance between said predetermined axis and said perimeter decreases in a monotonically non-increasing manner from said first position toward said second position along said circumferential direction and then increases in a monotonically non-decreasing manner;

each of said plurality of field magnet insertion holes has, at both ends in said circumferential direction, cavity portions on a side closer to said perimeter than said at least one of said plurality of field magnets inserted thereinto, the cavity portions extending in a direction toward said perimeter and a direction toward said first position along said perimeter;

at a point on said perimeter, said distance turns from decreasing to increasing between said first position and said second position is positioned on a side closer to said second position in said circumferential direction than an end of said cavity portion on said first position side in said circumferential direction; and said cavity portion extends substantially an entire distance between said point and said second position in said circumferential direction.

3. The field element according to claim 1, wherein said center of said one of said plurality of field magnet insertion holes in said circumferential direction is positioned towards said predetermined axis with respect to a straight line connecting both ends in said circumferential direction of said at least one of said plurality of field magnets inserted into said one of said plurality of field magnet insertion holes.

4. The field element according to claim 1, wherein a coercive force of said at least one of said plurality of field magnets is larger on an end portion side of one of said plurality of field magnet insertion holes in said circumferential direction than on said center side of said one of said plurality of field magnet insertion holes, said at least said one of said plurality of field magnets being inserted into said one of said plurality of field magnet insertion holes.

5. The field element according to claim 1, wherein an energy product of said at least one of said plurality of field magnets is larger on an end portion side of one of said plurality of field magnet insertion holes in said circumferential direction than on said center side of said one of said plurality of field magnet insertion holes, said at least said one of said plurality of field magnets being inserted into said one of said plurality of field magnet insertion holes.

6. The field element according to claim 1, wherein said at least one of said plurality of field magnets comprises a plurality of field magnets, said plurality of field magnets inserted into said one of said plurality of field magnet insertion holes being adjacent to each other in said circumferential direction or in a direction parallel to said axis.

7. The field element according to claim 1, wherein said center of said one of said plurality of field magnet insertion holes in said circumferential direction is positioned towards said predetermined axis with respect to a straight line connecting both ends in said circumferential direction of said at least one of said plurality of field magnets inserted into said one of said plurality of field magnet insertion holes.

8. The field element according to claim 2, wherein said center of said one of said plurality of field magnet insertion holes in said circumferential direction is positioned towards said predetermined axis with respect to a straight line connecting both ends in said circumferential direction of said at least one of said plurality of field magnets inserted into said one of said plurality of field magnet insertion holes.

9. The field element according to claim 1, wherein a coercive force of said at least one of said plurality of field magnets is larger on an end portion side of one of said plurality of field magnet insertion holes in said circumferential direction than on said center side of said one of said plurality of field magnet insertion holes, said at least said one of said plurality of field magnets being inserted into said one of said plurality of field magnet insertion holes.

10. The field element according to claim 2, wherein a coercive force of said at least one of said plurality of field magnets is larger on an end portion side of one of said plurality of field magnet insertion holes in said circumferential direction than on said center side of said one of said plurality of field magnet insertion holes, said at least said one of said plurality of field magnets being inserted into said one of said plurality of field magnet insertion holes.

11. The field element according to claim 1, wherein an energy product of said at least one of said plurality of field magnets is larger on an end portion side of one of said plurality of field magnet insertion holes in said circumferential direction than on said center side of said one of said plurality of field magnet insertion holes, said at least said one of said plurality of field magnets being inserted into said one of said plurality of field magnet insertion holes.

12. The field element according to claim 2, wherein an energy product of said at least one of said plurality of field magnets is larger on an end portion side of one of said plurality of field magnet insertion holes in said circumferential direction than on said center side of said one of said plurality of field magnet insertion holes, said at least said one of said plurality of field magnets being inserted into said one of said plurality of field magnet insertion holes.

13. The field element according to claim 1, wherein said at least one of said plurality of field magnets comprises a plurality of field magnets, said plurality of field magnets inserted into said one of said plurality of field magnet insertion holes being adjacent to each other in said circumferential direction or in a direction parallel to said axis.

14. The field element according to claim 2, wherein said at least one of said plurality of field magnets comprises a plurality of field magnets, said plurality of field magnets inserted into said one of said plurality of field magnet insertion holes being adjacent to each other in said circumferential direction or in a direction parallel to said axis.

15. The field element according to claim 2, wherein said center of said one of said plurality of field magnet insertion holes in said circumferential direction is positioned towards said predetermined axis with respect to a straight line connecting both ends in said circumferential direction of said at least one of said plurality of field magnets inserted into said one of said plurality of field magnet insertion holes.

16. The field element according to claim 2, wherein a coercive force of said at least one of said plurality of field magnets is larger on an end portion side of one of said plurality of field magnet insertion holes in said circumferential direction than on said center side of said one of said plurality of field magnet insertion holes, said at least said one of said plurality of field magnets being inserted into said one of said plurality of field magnet insertion holes.

17. The field element according to claim 2, wherein an energy product of said at least one of said plurality of field magnets is larger on an end portion side of one of said plurality of field magnet insertion holes in said circumferential direction than on said center side of said one of said plurality of field magnet insertion holes, said at least said one of said plurality of field magnets being inserted into said one of said plurality of field magnet insertion holes.

18. The field element according to claim 2, wherein said at least one of said plurality of field magnets comprises a plurality of field magnets, said plurality of field magnets inserted into said one of said plurality of field magnet insertion holes being adjacent to each other in said circumferential direction or in a direction parallel to said axis.

19. The field element according to claim 1, wherein at the same positions in said circumferential direction, a rate of increase of said distance in said circumferential direction is smaller than a rate of increase of a width of said second cavity portion in a radial direction with said predetermined axis being a center in said circumferential direction.

20. The field element according to claim 2, wherein at the same positions in said circumferential direction, a rate of increase of said distance in said circumferential direction is smaller than a rate of increase of a width of said cavity portion in a radial direction with said predetermined axis being a center in said circumferential direction.

* * * * *